United States Patent [19]

Iwahashi

[11] Patent Number: 4,807,826
[45] Date of Patent: Feb. 28, 1989

[54] TAPE REEL FOR TAPE CASSETTE

[75] Inventor: Yuji Iwahashi, Miyagi, Japan

[73] Assignee: Sony Corporation, Tokyo, Japan

[21] Appl. No.: 127,083

[22] Filed: Dec. 1, 1987

[30] Foreign Application Priority Data

Dec. 12, 1986 [JP] Japan .................. 61-191243[U]

[51] Int. Cl.$^4$ ............................................. B65H 75/14
[52] U.S. Cl. ............................................. 242/71.8
[58] Field of Search .................... 242/71.8, 68.5, 68.6, 242/118.4, 118.8, 199, 200

[56] References Cited

U.S. PATENT DOCUMENTS

| 4,176,804 | 12/1979 | Nemoto et al. | 242/68.5 |
| 4,203,564 | 5/1980 | Nemoto et al. | 242/71.8 |
| 4,254,919 | 3/1981 | Moodie | 242/71.8 |
| 4,403,749 | 9/1983 | Nakagawa | 242/71.8 |
| 4,452,404 | 6/1984 | Gelardi et al. | 242/71.8 |
| 4,564,156 | 1/1986 | Cybulski | 242/197 |
| 4,664,328 | 5/1987 | Yamada | 242/71.8 |

FOREIGN PATENT DOCUMENTS

| 2952350 | 7/1980 | Fed. Rep. of Germany . |
| 3108585 | 2/1982 | Fed. Rep. of Germany . |
| 57-56382 | 12/1982 | Japan . |
| 59-112472 | 6/1984 | Japan . |
| 2040264 | 8/1980 | United Kingdom . |

OTHER PUBLICATIONS

Research Disclosure, No. 225, Jul. 1985, No. 25552, pp. 369-371, Emsworth Hampshire.

Primary Examiner—John M. Jillions
Attorney, Agent, or Firm—Ronald P. Kananen

[57] ABSTRACT

A tape reel structure for a tape cassette provides radially extending ribs between an outer cylindrical section forming a tape reel section to be wound therearound with a tape, and an inner cylindrical section serving as a reel shaft boss. The rib at least has a portion extending substantially through an overall length of the outer cylindrical section so as to prevent radially inward deformation thereof. The rib joins with the inner cylindrical section at the inner edge. The upper end of the joining portion between the inner edge of the rib and the inner cylindrical section is oriented at lower elevation than that the upper end of the joining portion between the outer edge of the rib and the outer cylindrical section. This height difference is effective for preventing the outer cylindrical section from forming waveform unevenness during a molding process. The ribs extending substantially the overall length of the outer cylindrical section successfully prevent the outer cylindrical section from radially inward bending.

26 Claims, 2 Drawing Sheets

TAPE REEL FOR TAPE CASSETTE

BACKGROUND OF THE INVENTION

1. Field of the Invention

The present invention relates generally to a tape reel structure for a tape cassette. More specifically, the invention relates to a tape reel structure of a tape cassette with an improved reel flange supporting structure. Further particularly, the invention relates to a tape reel structure of a tape cassette with an inner cylindrical boss section and an outer cylindrical reel section coaxially arranged in a spaced apart relationship and connected by radially extending ribs.

2. Description of the Background Art

A magnetic tape cassette, such as a video tape cassette for a video tape recorder (VTR), has been disclosed in the Japanese Utility Model Second (examined) Publication (Jikko) Showa 57-56382. The disclosed magnetic tape cassette employs tape reels, each of which has upper and lower reel flanges. The tape reel also has coaxially arranged inner and outer sections in a spaced apart relationship to each other. The inner cylindrical section serves as a boss for drivingly receiving a reel shaft of an associated tape recording and/or reproducing apparatus. The outer cylindrical section forms a reel body so that a magnetic tape as a recording medium is wrapped or wound therearound. Radially extending ribs are provided so between the inner and outer cylindrical sections.

Such tape reels are formed of a synthetic resin by injection molding, in which molten resin is injected into molding dies. In this case, when the radially extending ribs extends through an overall length of the inner and outer cylindrical sections, flows of the molten resin injected through the radial center of the reel are formed so that the flows confluence at about the axial intermediate portion of the outer cylindrical section. Confluencing of the molten resin flows tends to form a wave on the outer periphery of the outer cylindrical section. That is, during the injection molding process, two molten resin flows are formed. The first resin flow flows radially through the portion of the die to form the lower reel flange. The second resin flow is formed to flow through the upper end wall of the portion for forming the upper end wall of the inner cylindrical section and through the upper end wall of the inner cylindrical section and through the upper end portion of the rib. Part of the resin in the first flow flows along the inner and outer cylindrical sections and the ribs toward the upper end. On the other hand, part of the molten resin in the second flow flows through the inner and outer cylindrical sections and the ribs toward the lower flange. Due to the opposite flow directions of the molten resin in the first and second flows confluencing at the axial intermediate portion, stress is created in the resin. This stress causes formation of a waving uneveness at the confluencing portion. When waving of the outer periphery of the outer cylindrical section is caused, wrinkles tend to be formed on the tape to cause disturbance of the signal or data to be recorded on the tape. Such disturbance of the recorded signal or data will cause a disturbance in the reproduced image in the case of a video tape.

Formation of waving uneveness on the outer periphery of the outer cylindrical section can be prevented by shortening the length of the rib so as to interrupt the second flow by discontinuous flow between the inner and outer cylindrical sections at the upper end thereof. In this case, however, another problem is encountered in resilient deformation at the discontinued portion of the outer cylindrical section toward the inner cylindrical section when the tape is tightly wound therearound. Namely, by shortening the ribs, an upper end portion of the outer cylindrical section becomes free from inward or radial bending. This causes radially inward bending of the portion where it is not restricted by the ribs. As a result of radially inward bending at the upper portion of the outer cylindrical section, the tape wound therearound may constantly be subjected to uneven force in a direction of the width thereof. When the stress exerted by the uneveness of the force in the transverse direction of the tape becomes significant, wrinkles may be formed on the tape to cause disturbance of the signal or data to be recorded on the tape.

SUMMARY OF THE INVENTION

Therefore, it is an object of the present invention to provide a tape reel which can solve the aforementioned drawbacks in the background art.

Another object of the invention is to provide a tape reel for a magnetic tape cassette, which will not form wrinkles on a tape.

A further object of the invention is to provide a tape reel structure for a tape cassette which will not form wave-form uneveness on a tape reel section.

In order to accomplish the aforementioned and other objects, a tape reel structure, according to the invention, provides radially extending ribs at least having a portion extending substantially through an overall length of an outer cylindrical section of a tape reel so o as to prevent radially inward deformation thereof. The ribs in the tape reel of the invention join with an inner cylindrical section of the tape reel, which serves as a boss for drivingly receiving a reel shaft of an associated recording and/or reproducing apparatus, at a lower elevation than the joining section between the outer cylindrical section and the ribs.

This axial height difference of the joining portions between the ribs and the outer cylindrical section, and between the ribs and the inner cylindrical section, may prevent a resin flow from confluencing at the axial intermediate portion of the outer cylindrical section and thus preventing the flow from creating stress for causing waving uneveness on the outer periphery of the outer cylindrical section.

According to one aspect of the invention, a tape reel structure for a tape cassette comprises a tape reel including an inner cylindrical reel shaft boss section and an outer cylindrical tape reel section, the inner and outer cylindrical sections being coaxially arranged relative to each other in a mutually spaced relationship and a plurality of radially extending ribs extending between the inner and outer cylinder sections, the ribs having a first portion joining with the inner periphery of the outer cylindrical section and a second portion joining with the outer periphery of the inner cylindrical section, an upper reel flange to be mounted on the tape reel, and a lower flange section formed integrally with the tape reel, wherein the first portion of the ribs extends substantially through an overall height of the outer cylindrical section and has a first upper end and the second joining portion of the rib extends substantially through an overall height of the inner cylindrical section and has a second upper end, wherein the second upper end is oriented at a lower elevation relative to that of the first upper end section.

According to another aspect of the invention, a tape cassette including a tape reel, which tape reel comprises an upper reel flange to be mounted on the tape reel, a lower flange section formed integrally with the tape reel, an inner cylindrical reel shaft boss section, an outer cylindrical tape reel section coaxially arranged to the inner cylindrical section in a spaced apart relationship to the latter, and a plurality of radially extending ribs extending between the inner and outer cylinder sections, the ribs having a first portion joining with the inner periphery of the outer cylindrical section and a second portion joining with the outer periphery of the inner cylindrical section, wherein the first portion of the ribs extends substantially through an overall height of the outer cylindrical section and has a first upper end and the second joining portion of the rib extends substantially through an overall height of the inner cylindrical section and has a second upper end, and the second upper end being oriented at a lower elevation to that of the first upper end section.

In practice, the tape reel structure set forth above is particularly applicable for a tape reel which is formed of a synthetic resin by molding, such as an injection molding process.

In the preferred construction, each of the ribs has an upper end including a first upper end plane lying on a first horizontal plane extending through the first upper end of the first joining portion and a second upper end plane lying on a second horizontal plane which extends through the second upper end of the second joining portion and at lower elevation than the first horizontal plane. The upper flange has a downwardly projected section having a circumferential edge substantially conforming the upper end plane of the rib.

In the alternative, each of the ribs has an upper end plane substantially lying on a horizontal plane extending through the first upper end of the first joining portion, and has the second upper end of the second joining portion at vertical intermediate position lower elevation than the horizontal plane.

The upper flange defines a space for receiving the upper end portion of the outer cylindrical section and the ribs. The space is defined by through openings formed through the upper reel flange.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments, but are for explanation and understanding only.

In the drawings.

DESCRIPTION OF THE PREFERRED EMBODIMENT

Figure 1:
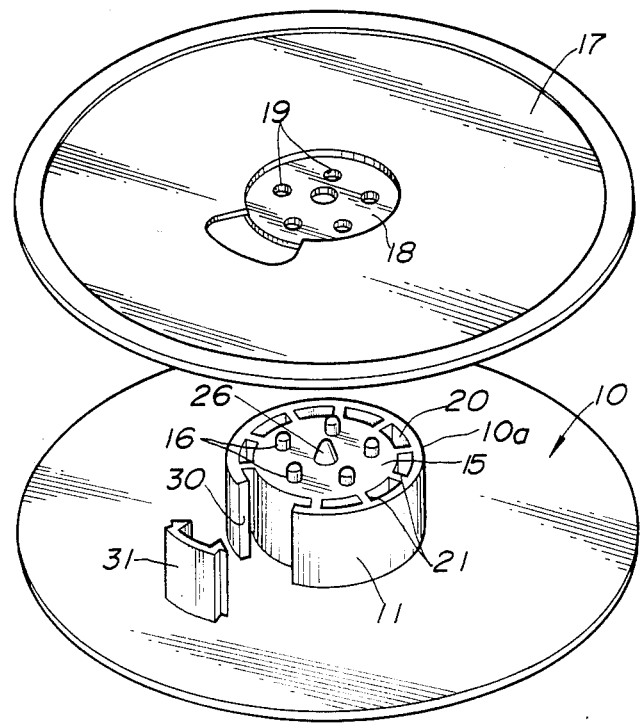
FIG. 1 is an exploded perspective view of a tape reel to which the tape reel structure according to the present invention is applicable.
Figure 2:
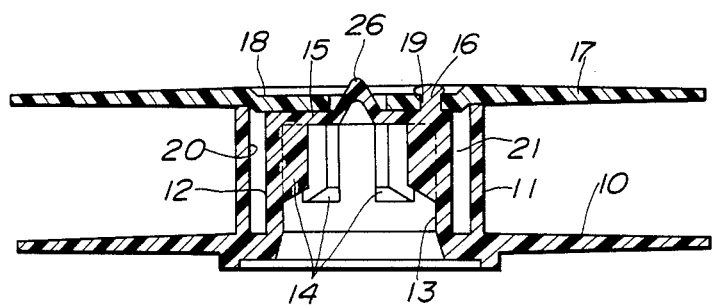
FIG. 2 is a cross-section of the preferred embodiment of a tape reel structure according to the invention.

Referring now to the drawings, particularly to FIGS. 1 and 2, a tape reel of a magnetic tape cassette, such as a VTR tape cassette, is made of a synthetic resin. The tape reel has a lower reel flange 10 integrally formed with tape reel section 10a. The tape reel section 10a comprises an outer cylindrical tape reel section 11 and an inner cylindrical boss section 12. The inner cylindrical section defines a lower end opened recess 13, into which engaging claws 14 are formed for drivingly engaging with a reel shaft of an associated recording and/or reproducing apparatus. e.g. VTR. The head of the reel shaft is inserted into the recess 13 of the inner cylindrical section 12 when the tape cassette is loaded in the recording and/or reproducing apparatus.

The inner cylindrical section 12 has an upper wall 15 with a center positioning projection 26. A plurality of pins 16 project from the upper surface of the upper wall 15. An upper reel flange 17 is mounted on the upper end of the tape reel section 10a. The upper reel flange 17 has a central portion 18 which is downwardly depressed so as to be projected from the lower surface of the general section of the upper reel flange. A plurality of through holes 19 are formed in the central portion 18 of the upper reel flange 17. The pins 16 pass through the holes 19. The top ends of the pins 16 are clamped by heat clamping so that the upper reel flange 17 can be fixedly fastened on the top of the tape reel section 10a.

Figure 3:
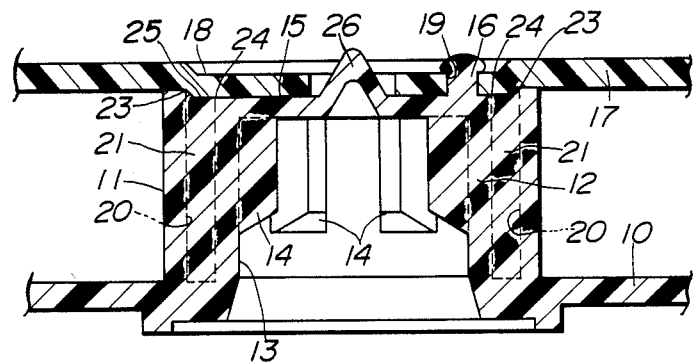
FIG. 3 is an enlarged section of the tape reel of FIG. 2.

As shown in FIG. 2, the outer and inner cylindrical sections 11 and 12 are coaxially arranged in spaced apart relationship to each other to define therebetween an annular space 20. Between the outer and inner cylindrical sections 11 and 12, a plurality of radially extending ribs 21 are formed. Each of the ribs extends radially through the annular space 20. The ribs 21 extend through substantially the overall height of the outer and inner cylindrical sections 11 and 12. The rib 21 joins to the inner periphery of the outer cylindrical section 11 at its outer vertical edge. The joining section between the inner periphery of the outer cylindrical section 11 and the outer vertical edge of the rib 21 will be hereafter referred to as first joining section 23a. On the other hand, the inner vertical edge of the rib 21 joins with the outer periphery of the inner cylindrical section 12. The joining portion between the inner vertical edge of the rib 21 and the outer periphery of the inner cylindrical section 12 will be hereafter referred to as second joining section 24a. The top end 23 of the first joining section 23a lies on a horizontal plane extending through the upper end of the outer cylindrical section 11. Similarly, the top end 24 of the second joining section 24a lies on a horizontal plane extending through the upper general surface of the upper wall 15 of the inner cylindrical section 12. The top ends 23 and 24 of the rib 21 are connected by a sloped section 25. The inclination of the sloped section 25 is determined so as to match with the inclination of the circumferential tapered edged of the center portion 18 of the upper reel flange 17. As seen from FIG. 3, the height of the top ends 23 and 24 of the first and second joining sections 23a and 24a are differentiated relative to each other. Namely, the top end 23 of the first joining section 23a is higher than that of the top end 24 of the second joining section 24a.

The outer cylindrical section 11 is formed discontinuously at a portion 30. The discontinuous portion 30 allows communication between the outside of the tape reel section 10a and the annular space 20 so that one end of a tape such as a VTR tape can be inserted into the annular space. The discontinuous portion 30 is closed by a clamper 31. The clamper 31 is designed to fixedly engage with the discontinuous portion 30 to form part of the outer cylindrical section 11 by circumferentially aligning the outer periphery thereof with the outer periphery of the general section of the outer cylindrical section 11. When installed, the clamper 31 grips the associated end of the tape.

With the construction set forth above, the tape reel of the shown embodiment will not form the wave-form unevenness on the outer periphery of the outer cylindrical section 11 during a molding process. Namely, during a molding process, the flow of the molten resin which flows from the portion constituting the upper wall of the inner cylindrical section, is restricted by the difference of the height at the top ends 23 and 24 of the first and second joining sections. This causes a reduction of the flow velocity of the molten resin. As a result, the outer cylindrical section 11 is formed by the resin flowing from the portion forming the lower flange. This prevents the molten resin from confluencing at the axial intermediate portion of the outer cylindrical section. Therefore, the stress may not be created, which stress may form the wave-form unevenness on the outer periphery of the outer cylindrical section.

In addition, since the ribs extend substantially for the overall height of the outer and inner cylindrical section, they may successfully prevent the inner cylindrical section 11 from bending radially inward so as not to cause stress in the tape wound around the tape reel section. Therefore, even in use, wrinkles will not be formed on the tape.

Figure 4:
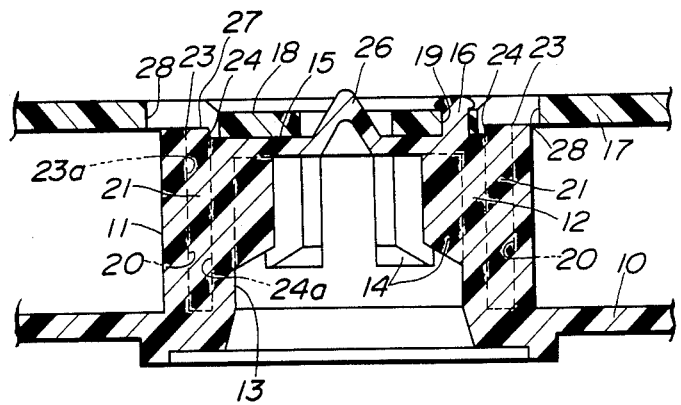
FIG. 4 is a section of another embodiment of the tape reel structure.

FIG. 4 shows another embodiment of the tape reel structure according to the invention. In this embodiment, the rib 21 has a top edge 27 oriented at an even height level as the top edge of the outer cylindrical section 11. In this embodiment, the top end 23 of the first joining section 23a resides on the top edge 27. On the other hand, the top 24 of the second joining section resides on the inner vertical edge of the rib. In the construction of FIG. 4, the upper end portion of the ribs 21 projects at the level of the upper portion of the outer cylindrical section 11. In order to accept the upper end sections of the ribs 21, through openings 28 are formed through the upper reel flange.

Similarly to the foregoing first embodiment, formation of the wave-form unevenness on the outer periphery of the cylindrical section 11, during a molding process may be successfully prevented by the height difference of the top ends 23 and 24 of the first and second joining sections. In addition, the ribs 21 also prevent the outer cylindrical section 11 from radially and inwardly bending by the pressure exerted from the tape wound therearound.

Therefore, the present invention fulfills all of the objects and advantages sought therefor.

While the present invention has been discussed in terms of the preferred embodiments of the invention. However, the invention may be implemented in various embodiments other than the shown embodiments and the shown embodiments can be modified in various forms. Therefore, the invention should be appreciated to include all of possible embodiments and modifications which can be implemented without departing from the principle of the invention which set out in the appended claims.

What is claimed is:

1. A tape reel structure for a tape in a tape cassette comprising:
    a tape reel including an inner cylindrical reel shaft boss section and an outer cylindrical tape reel section wherein said tape is found directly on an outer periphery of said outer cylindrical section, said inner and outer cylindrical sections being coaxially arranged relative to each other in a mutually spaced relationship, and a plurality of radially extending ribs extending between said inner and outer cylinder sections, said ribs having a first portion joining with the inner periphery of said outer cylindrical section and a second portion joining with the outer periphery of said inner cylindrical section;
    an upper reel flange mounted on said tape reel; and
    a lower flange section formed integrally with said tape reel;
    wherein said first portion of said ribs extends substantially through an overall height of said outer cylindrical section and has a first upper end and said second joining portion of said ribs extends substantially through an overall height of said inner cylindrical section and has a second upper end, said second upper end being oriented at a lower elevation relative to that of said first upper end section, as measured axially along an axis of said tape reel.

2. A tape reel structure as set forth in claim 1, which is formed of a synthetic resin by molding.

3. A tape reel structure as set forth in claim 1, which is formed of a synthetic resin by an injection molding process.

4. A tape reel structure as set forth in claim 1, wherein each of said ribs has an upper end including a first upper end portion lying on a first horizontal plane extending through said first upper end of said first joining portion and a second upper end portion lying on a second horizontal plane which extends through said second upper end of said second joining portion and at a lower elevation than said first horizontal plane.

5. A tape reel structure as set forth in claim 4, wherein said upper flange has a downwardly projected section having a circumferential edge substantially conforming to said upper end of said ribs.

6. A tape reel structure as set forth in claim 1, wherein said each of said ribs has an upper end portion substantially lying on a horizontal plane extending through said first upper end of said first joining portion, and has said second upper end of said second joining portion at a vertical intermediate position lower in elevation than said horizontal plane.

7. A tape reel structure as set forth in claim 6, wherein said upper flange defines a space for receiving the upper end portion of said outer cylindrical section and said ribs.

8. A tape reel structure as set forth in claim 7, wherein said space is defined by through openings formed through said upper reel flange.

9. A tape cassette including a tape reel for receiving a tape, which tape reel comprises:
    an upper reel flange mounted on said tape reel;
    a lower flange section formed integrally with said tape reel;
    an inner cylindrical reel shaft boss section;
    an outer cylindrical tape reel section coaxially arranged relative to said inner cylindrical section in a spaced apart relationship to the latter, the outer periphery of said outer cylindrical tape reel section directly receiving a tape thereon; and a plurality of radially extending ribs extending between said inner and outer cylindrical sections, said ribs having a first portion joining with the inner periphery of said outer cylindrical section and a second portion joining with the outer periphery of said inner cylindrical section, wherein said first portion of said ribs extends substantially through an overall height of said outer cylindrical section and has a first upper end, and said second joining portion of said ribs extends substantially through an overall height of said inner cylindrical section and has a second upper end, and said second upper end is oriented at a lower elevation than that of said first upper end section.

10. A tape reel structure as set forth in claim 9, which is formed of a synthetic resin by molding.

11. A tape reel structure as set forth in claim 9, which is formed of a synthetic resin by an injection molding process.

12. A tape reel structure as set forth in claim 9, wherein each of said ribs has an upper end including a first upper end portion lying on a first horizontal plane extending through said first upper end of said first joining portion and a second upper end portion lying on a second horizontal plane which extends through second upper end of said second joining portion and at a lower elevation than said first horizontal plane.

13. A tape reel structure as set forth in claim 12, wherein said upper flange has a downwardly projected section having a circumferential edge substantially conforming to said upper end of said ribs.

14. A tape reel structure as set forth in claim 9, wherein said each of said ribs has an upper end portion substantially lying on a horizontal plane extending through said first upper end of said first joining portion, and has said second upper end of said second joining portion at a vertical intermediate position lower in elevation than said horizontal plane.

15. A tape reel structure as set forth in claim 14, wherein said upper flange defines a space for receiving the upper end portion of said outer cylindrical section and said ribs.

16. A tape reel structure as set forth in claim 15, wherein said space is defined by through openings formed through said upper reel flange.

17. A tape reel structure for a tape cassette comprising:

a tape reel including an inner cylindrical reel shaft boss section and an outer cylindrical tape reel section, said inner and outer cylindrical sections being coaxially arranged relative to each other in a mutually spaced relationship, and a plurality of radially extending ribs extending between said inner and outer cylinder sections, said ribs having a first portion joining with the inner periphery of said outer cylindrical section and a second portion joining with the outer periphery of said inner cylindrical section;

an upper reel flange mounted on said tape reel; and a lower flange section formed integrally with said tape reel;

wherein said first joining portion of said ribs extends substantially through an overall height of said outer cylindrical section and has a first upper end, and said second joining portion of said ribs extends substantially through an overall height of said inner cylindrical section and has a second upper end, said second upper end being oriented at a lower elevation than that of said first upper end; and wherein each of said ribs has an upper end including a first upper end portion lying on a first horizontal plane extending through said first upper end of said first joining portion and a second upper end portion lying on a second horizontal plane which extends through said second upper end of said second joining portion and a lower elevation than said first horizontal plane, said upper flange having a downwardly projected section having a circumferential edge substantially conforming to said upper end of said rib.

18. A tape reel structure as set forth in claim 17, which is formed of a synthetic resin by molding.

19. A tape reel structure a set forth in claim 17, which is formed of a synthetic resin by an injection molding process.

20. A tape reel structure for a tape in a tape cassette comprising:

a tape reel including an inner cylindrical reel shaft boss section and an outer cylindrical tape reel section, said inner and outer cylindrical sections being coaxially arranged relative to each other in a mutually spaced relationship, and a plurality of radially extending ribs extending between said inner and outer cylinder sections, said ribs having a first portion joining with the inner periphery of said outer cylindrical section and a second portion joining with the outer periphery of said inner cylindrical section;

an upper reel flange mounted on said tape reel; and a lower flange section formed integrally with said tape reel;

wherein said first portion of said ribs extends substantially through an overall height of said outer cylindrical section and has a first upper end and said second joining portion of said ribs extends substantially through an overall height of said inner cylindrical section and has a second upper end, said second upper end being oriented at a lower elevation than that of said first upper end section;

each of said ribs having an upper end substantially lying on a horizontally plane extending through said first upper end of said first joining portion, and having said second upper end of said second joining portion at a vertical intermediate position lower in elevation than said horizontal plane;

wherein said upper flange defines a space for receiving the upper end portion of said outer cylindrical section and said ribs.

21. A tape reel structure as set forth in claim 20, wherein said space is defined by through openings formed through said upper reel flange.

22. A tape cassette including a tape reel, which tape reel comprises:

an upper reel flange to be mounted on said tape reel;

a lower reel flange section formed integrally with said tape reel;

an inner cylindrical reel shaft boss section;

an outer cylindrical tape reel section coaxially arranged relative to said inner cylindrical section in a spaced apart relationship to the latter;

a plurality of radially-extending ribs extending between said inner and outer cylinder sections, said ribs having a first portion joining with the inner periphery of said outer cylindrical section and a second portion joining with the outer periphery of said inner cylindrical section, wherein said first joining portion of said ribs extends substantially through an overall height of said outer cylindrical section and has a first upper end and said second joining portion of said ribs extends substantially through an overall height of said inner cylindrical section and has a second upper end, and said second upper end is oriented at a lower elevation than that of said first upper end section; and wherein each of said ribs has an upper end including a first upper end portion lying on a first horizontal plane extending through said first upper end of said first joining portion and a second upper end portion lying on a second horizontal plane which extends through said second upper end of said second joining portion and at lower elevation than said first horizontal plane, wherein said upper flange has a downwardly projected section having a circumferential edge substantially conforming to the upper end of said rib.

23. A tape reel structure as set forth in claim 22, which is formed of a synthetic resin by molding.

24. A tape reel structure as set forth in claim 22, which is formed of a synthetic resin by an injection molding process.

25. A tape cassette including a tape reel, which tape reel comprises:

an upper reel flange to be mounted on said tape reel;
a lower flange section formed integrally with said tape reel;
an inner cylindrical reel shaft boss section;
an outer cylindrical tape reel section coaxially arranged relative to said inner cylindrical section in a spaced apart relationship to the latter;
a plurality of radially-extending ribs extending between said inner and outer cylindrical sections, said ribs having a first portion joining with the inner periphery of said outer cylindrical section and a second portion joining with the outer periphery of said inner cylindrical section, wherein said first joining ortion of said ribs extends substantially through an overall height of said outer cylindrical section and has a first upper end and said second joining ortion of said ribs extends substantially through an overall height of said outer cylindrical section and has a first upper end and said second joining ortion of said ribs extends substantially through an overall height of said inner cylindrical section and has a second upper end, and said second upper end is oriented at a lower elevation than that of said first upper end;

wherein said each of said ribs has an upper end substantially lying on a horizontal plane extending through said first upper end of said first joining portion, and has said second upper end of said second portion at a vertical intermediate position lower in elevation than said horizontal plane; and wherein said upper flange defines a space for receiving the upper end portion of said outer cylindrical section and said ribs.

26. A tape reel structure as set forth in claim 25, wherein said space is defined by through openings formed through said upper reel flange.

* * * * *